US000001080H

United States Statutory Invention Registration [19]

[11] Reg. Number: H1080

Bard et al.

[43] Published: Jul. 7, 1992

[54] ELECTRONIC LIGHT BEAM SWITCH

[75] Inventors: Arnold Bard, Elberon; Stanley Kronenberg, Skillman, both of N.J.

[73] Assignee: The United States of America as represented by the Secretary of the Army, Washington, D.C.

[21] Appl. No.: 611,556

[22] Filed: Nov. 13, 1990

[51] Int. Cl.[5] ..... G02F 1/00

[52] U.S. Cl. ..... 385/16; 385/11; 385/24

[58] Field of Search ..... 350/96.13, 96.15, 96.24, 350/96.2, 374, 384, 388, 390

[56] References Cited

FOREIGN PATENT DOCUMENTS 62-138838 6/1987 Japan ..... 350/96.14

*Primary Examiner*—Bernarr E. Gregory

*Attorney, Agent, or Firm*—Michael Zelenka; William H. Anderson

[57] ABSTRACT

The invention disclosed herein is a fiber optic switch which utilizes Kerr cells to change the polarization of light passing through a pair of polarizers when an electric field is applied to the Kerr cell. The fiber optic switch is comprised of a pair of transparent polarized panels which have the same index of refraction, a pair of transparent electrodes which are electrically connected to a power source and an electric switch and which are sandwiched between the transparent polarized panels, and a layer of anisotropic material which fills the space between the electrodes.

5 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ELECTRONIC LIGHT BEAM SWITCH

GOVERNMENT INTEREST

The invention described herein may be manufactured, used and licensed by or for the Government of the United States for governmental purposes without the payment to us of any royalties thereon.

FIELD OF THE INVENTION

The present invention relates generally to the technology of fiber optic light switches, particularly to switches that utilize an electric current in conjunction with crystal systems, and more particularly to fiber optic switches utilizing Kerr cells.

BACKGROUND OF THE INVENTION

It is well known that when an electric field is applied to liquids with anisotropic molecules, an optical birefringence is induced. This effect is referred to as the Kerr effect and is generally defined as a quadratic function of the applied electric field. Thus, when an electric field is applied to a Kerr cell constructed on this principle it changes from opaque to transparent.

Heretofore liquid crystals have been incorporated in fiber optic switching devices as disclosed in U.S. Pat. No. 3,918,794 issued to A. Fenner Milton on Nov. 11, 1975. This device, however, has a relatively slow switch rate as compared to the rate of the present device which utilizes the Kerr effect as the principle used in the optic switch.

SUMMARY OF THE INVENTION

It is an objective of this invention to provide a high speed switch for fiber optic cables.

It is another objective of this invention to provide a low cost fiber optic switch that may be fabricated in volume.

It is another objective to provide a fiber optic switch with no moving or mechanical parts.

These and other objectives are accomplished by the present invention which utilizes the Kerr effect in anisotropic materials with pairs of polarizers to switch light paths from one fiber optic bundle to another by applying an electrical field to the anisotropic material. The present invention comprises a fiber optic cable that is divided into several fiber optic bundles. At each fiber optic bundle a switch device is inserted along the bundle. The switch device comprises a pair of transparent polarizers with the same index of refraction. These polarizers, in turn, sandwich a pair of transparent electrodes. The space between the transparent electrodes is filled with an anisotropic material. The electrodes of the switch device are electrically connected to a power source and an electrical switch. Depending on the desired effect, the polarizers may be paired in a number of different ways. Generally, one set of polarizers is positioned such that the pair of polarizers are aligned with each other and the other set such that its pair are crossed.

In the absence of an electrical field between the electrodes, the anisotropic material passes the light between the electrodes. However, the set of crossed polarizers does not transmit the light while the set of aligned polarizers does pass the light. With the electric field between the electrodes, the unit with the crossed polarizers transmits the light while the unit with the aligned polarizers does not. The anisotropic material passes the light with or without the presence of the electric field.

This invention may be inserted into any optical transmission line.

DETAILED DESCRIPTION OF THE DRAWING

Figure 1:
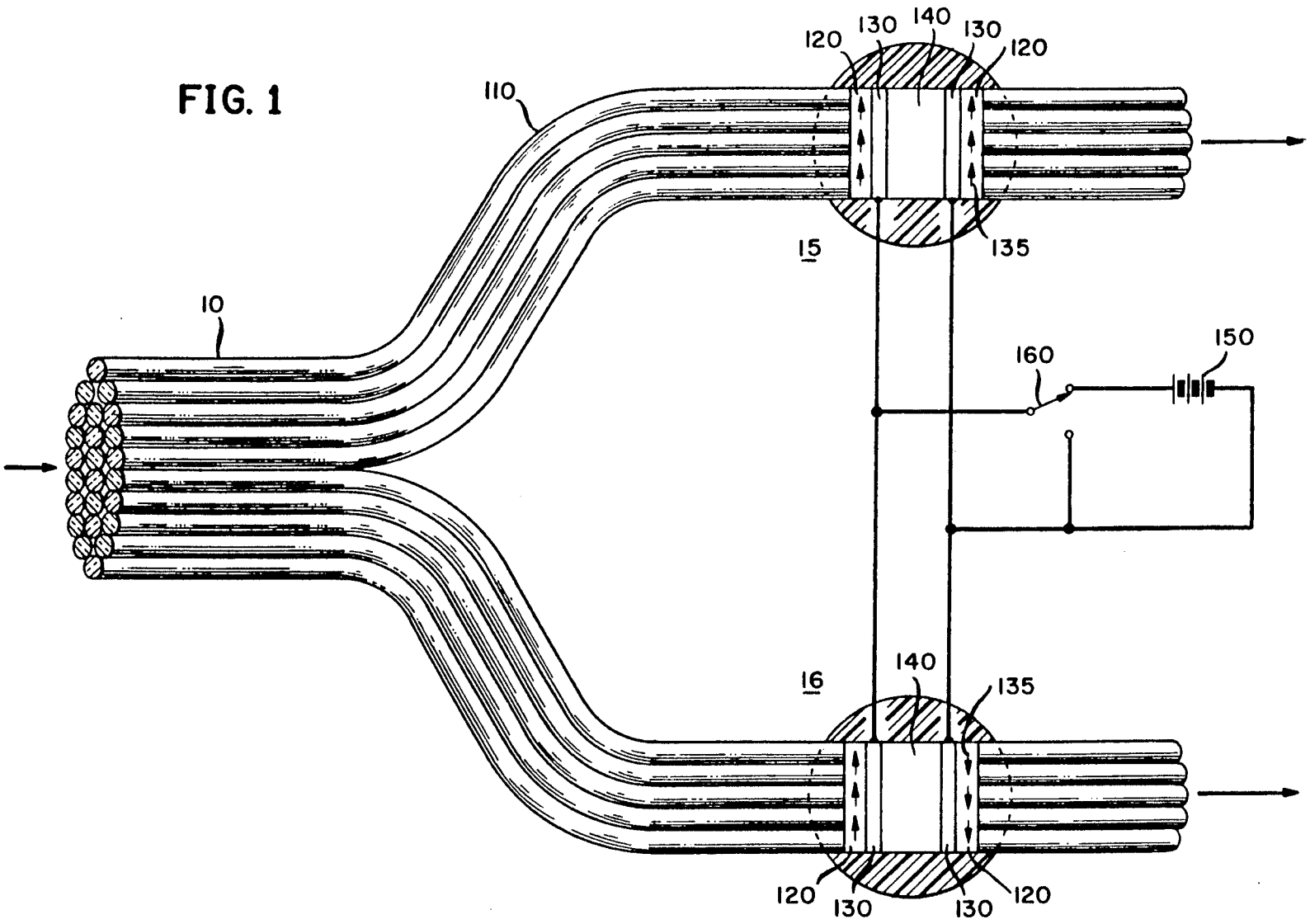
FIG. 1 is a schematic illustration of the present invention.

FIG. 1 is a schematic illustration of the present invention. The major components of the present invention are a fiber optic cable 10 that is divided into several fiber optic bundles 110; polarizer units 15 and 16 with polarizers 120 of the same index of refraction which are attached to a polished end of each fiber optic bundle 110; transparent electrodes 130 which are sandwiched between the polarizers; anisotropic material 140, such as nitrobenzene, which fills the space between the pairs of transparent electrodes 130; a power source 150 which is electrically connected to the transparent electrodes; and an electric switch 160 that completes the circuit between the power source 150 and transparent electrodes 130 when the electric switch 160 is activated. The polarizer units 15 and 16 have polarizers 120 that are either aligned such that they cross each other or they complement each other. With the electric field switched on, the polarizer unit 16 with crossed polarizations (as shown by arrows 135) is transparent and the polarizer unit 15 with aligned polarizations (as shown by arrows 135) is opaque. When the electric field is off, the polarizer unit 16 with crossed polarizations becomes opaque and the polarizer unit 15 with aligned polarizations becomes transparent. Therefore, when the electrical switch is activated the aligned polarizer unit is opaque and the crossed polarizer unit is transparent. The converse is the case when the electric switch is not activated.

Various modifications may be used to couple light signals from different fiber optic bundles or cables to other fiber optic lines or to add light signals through a cable from an auxiliary line. The properties of an anisotropic material permit light of one polarization to be switched from one filer optic bundle to another. Therefore, the cross-sections of the fiber optic bundles should equal each other through any one coupling. The polarizer units should also be attached only to polished ends of the fiber optic bundles.

The exact dimensions and configurations of the fiber optic switch are all considered to be within the knowledge of persons conversant with this art. It is therefore considered that the foregoing disclosure relates to a general illustration of the invention and should not be construed in any limiting sense, it being the intent to define the invention by the appended claims.

What is claimed is:

1. A fiber optic switch useful for switching a portion of a fiber optic signal transmitted through a multi-fiber optic cable to at least one other fiber optic cable, the fiber optic switch comprising:

a first transparent polarized panel;

a fiber optic cable wherein an end of the fiber optic cable is attached to said first transparent polarized panel;

a first electrode connected to said first transparent polarized panel;

a power source electrically connected to said first electrode;

a second electrode positioned adjacent to said first electrode;

an electric switch electrically connected to said second electrode;

a second transparent polarized panel connected to the opposite end of said fiber optic cable and connected to said second electrode, said second transparent polarized panel having an index of refraction equal to that of said first transparent polarized panel;

an anisotropic material disposed between said first and second electrodes.

2. The fiber optic switch of claim 1 wherein said fiber optic switch is connected to a plurality of fiber optic cables.

3. The fiber optic switch of claim 1 wherein said anisotropic material consists of nitrobenzene.

4. The fiber optic switch of claim 1 wherein said fiber optic switch is hermetically sealed.

5. The fiber optic switch of claim 1 wherein said fiber optic switch is attached to polished and fused ends of said fiber optic bundle.

* * * * *